March 5, 1940.　　　J. W. ERRETT　　　2,192,302
GLASS MACHINE
Filed July 8, 1935　　　4 Sheets-Sheet 1

INVENTOR.
John W. Errett
BY Norman N. Holland
his ATTORNEY.

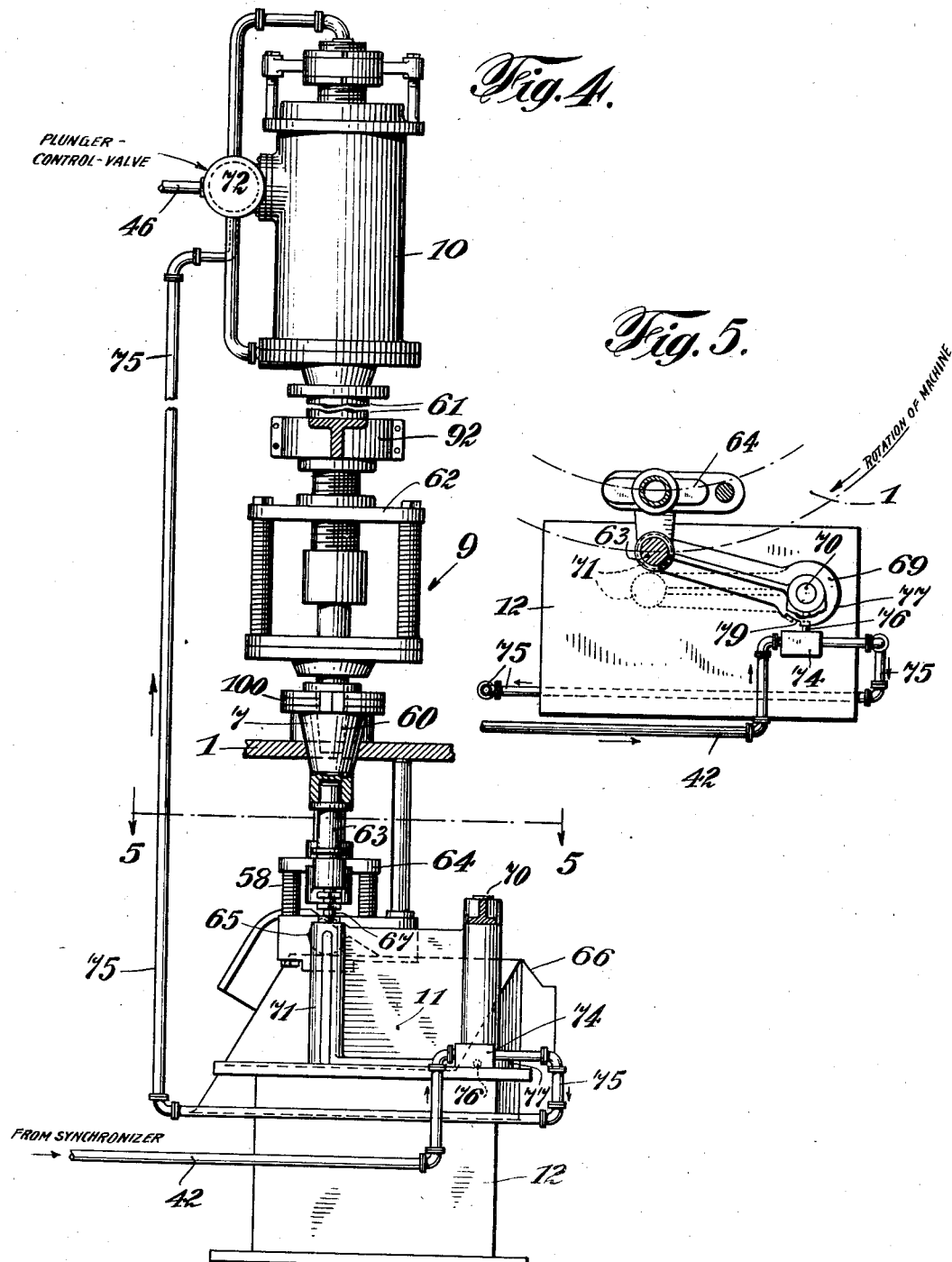

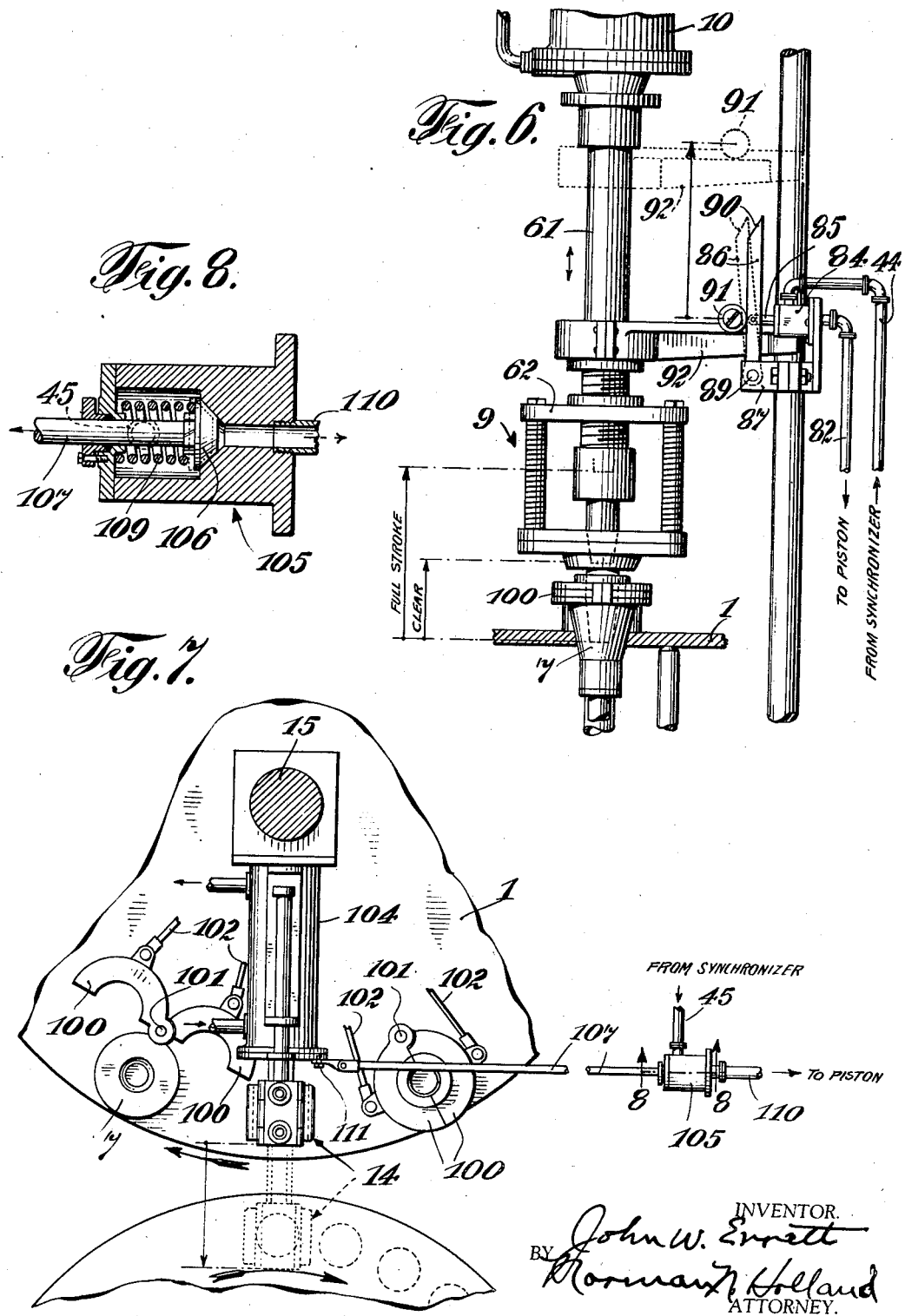

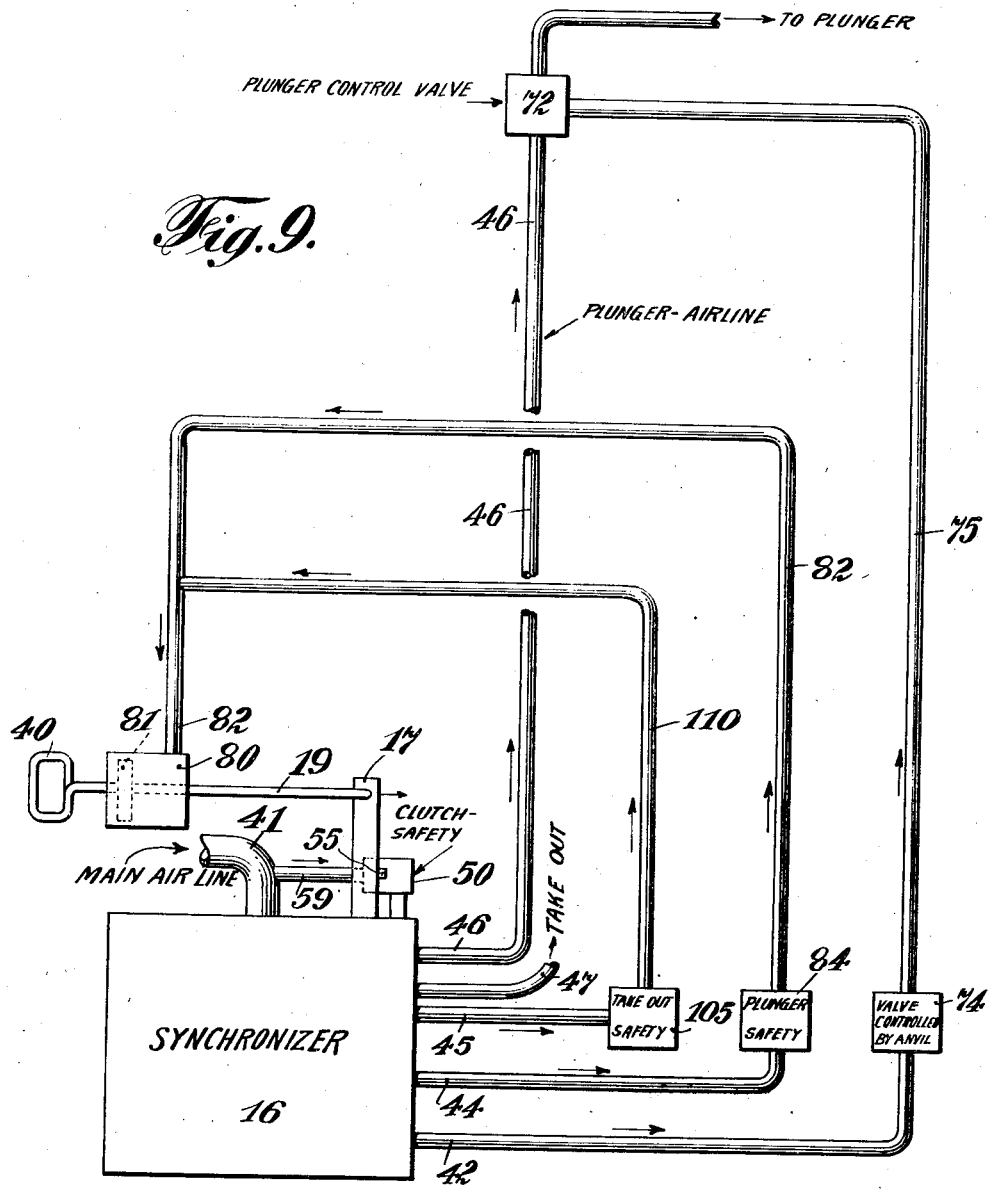

Patented Mar. 5, 1940

2,192,302

UNITED STATES PATENT OFFICE 2,192,302

GLASS MACHINE

John W. Errett, Connellsville, Pa., assignor to Capstan Glass Company, Connellsville, Pa., a corporation of Delaware Application July 8, 1935, Serial No. 30,216

9 Claims. (Cl. 49—9)

The present invention relates to the manufacture of glassware and more particularly to improvements in glass molding machines.

Glass containers such as bottles, jars and tumblers ordinarily are manufactured by automatic molding machines which comprise a rotatable table having a plurality of molds thereon and suitable devices for blowing or pressing the ware in the molds. These machines are usually partly operated by a mechanical drive, such as an electric motor or other type of driving mechanism and are partly operated by pneumatic means, such as air pressure, for actuating the pressing and blowing devices. One of the difficulties encountered with these machines is that the air pressure may accidentally fail to be effective to operate the various pressing or blowing devices while the table is being rotated. This is very objectionable because certain of the molding devices may be in the path of the rotating table causing the molds or other devices on the table to collide therewith. Such collisions may cause considerable damage and consequently necessitate the machine to be shut down for expensive repairs. Another difficulty is that careless operators may start the drive means for rotating the table without first turning on the air pressure for operating the pressing and blowing devices. If this is done, the air operated parts fail to function at their desired intervals and may interfer with the rotation of the mold table.

The present invention aims to overcome or minimize the above and other difficulties by providing improvements in glass molding machines which prevent the machine from being operated unless the air pressure is effective to operate the various pneumatic devices. In addition, the present invention aims to increase the speed of the machines and operation of the parts thereof to produce larger quantities of ware without damage to the machine or the parts thereof. The present invention also aims to provide improvements adapted to be installed on both new and existing machines, without substantial expense.

An object of the present invention is to provide an improved glass molding machine.

Another object of the invention is to provide devices for glass fabricating machines adapted to prevent operation of a machine unless all the operating parts thereof are in their proper position at predetermined intervals.

Another object of the invention is to provide a glass molding machine, partly operated by a mechanical drive mechanism and partly operated by air pressure, having a device associated therewith which is adapted to prevent operation of the mechanical drive unless the air pressure is effective.

Another object of the invention is to provide a device for a molding machine adapted to stop rotation of the mold table when stationary parts of the machine are in the path of the mold table.

Another object of the invention is to provide a device for a glass molding machine for preventing rotation of the mold table while the forming plunger is in the mold or in the path thereof.

Another object of the invention is to provide a device for a glass machine adapted to stop rotation of the mold table when a mold fails to open and comes into contact with the means for removing the ware therefrom.

A further object of the invention is to provide both new and existing glass molding machines with the above improvements without substantially increasing the cost of the machines.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a diagrammatic elevational view of a preferred form of glass molding machine adapted to be provided with the improvements of the present invention;

Fig. 4 is a side elevational view illustrating, in detail, a portion of the glass molding machine and associated parts;

Fig. 5 is a sectional view taken along the line 5—5 of Fig. 4;

Fig. 6 is a side elevational view illustrating improvements associated with the molding plunger;

Fig. 7 is a top plan view illustrating a portion of the mold table and improvements associated with the take out mechanism;

Fig. 8 is a sectional view taken along the line 8—8 on Fig. 7; and

Fig. 9 is a pressure conduit diagram illustrating a preferred way of supplying air pressure to parts of the machine.

Figure 1:
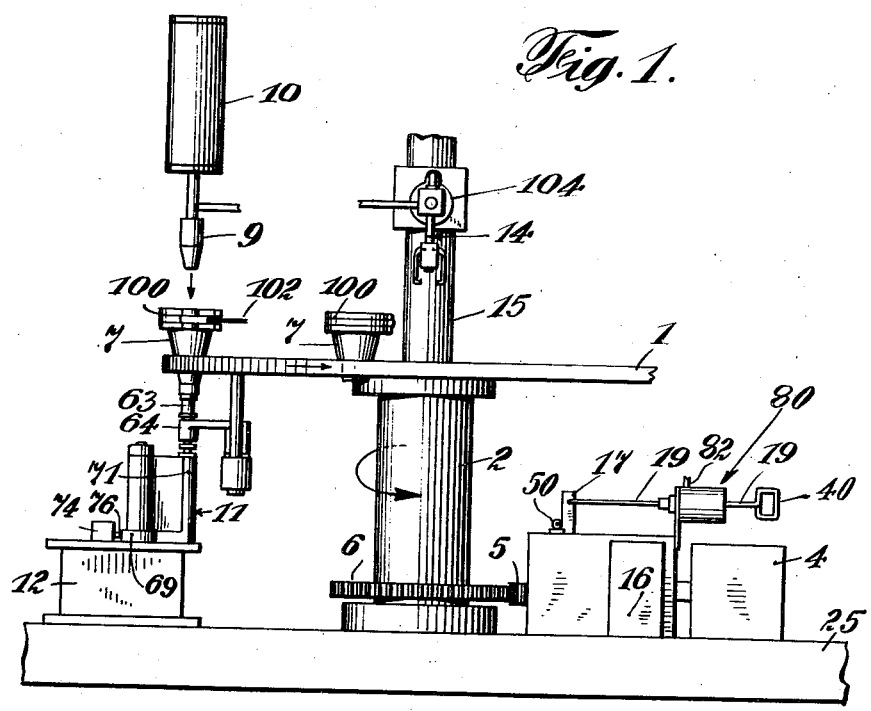

Referring again to the drawings, and more particularly to Fig. 1, there is shown a glass fabricating machine, here illustrated as a machine for pressing charges of glass into blanks adapted to be shaped into bottles, jars or tumblers. It will be understood that the invention is not to the particular type of machine shown, but is applicable to press and blow, and blow and blow machines. The machine is illustrated diagrammatically to show more clearly the essential elements thereof. Described generally, the machine comprises, a mold table 1 rotatably mounted on a column 2 and intermittently rotated by a suitable mechanical drive such as an electric motor 4 through the intermediation a Geneva drive or other suitable means and suitable gears such as gears 5 and 6. If desired, the table may be rotated intermittently by an air cylinder. A plurality of molds 7, herein shown as blank molds, are supported upon the mold table and a plunger 9 operated by an air cylinder 10 is adapted to shape charges of glass in the molds. While the plunger is effective, the lower end of the mold is adapted to be supported by a suitable gate anvil 11 swingingly mounted on an anvil block 12. A suitable take-out mechanism 14, also operated by an air pressure cylinder, is mounted on a column 15 extending through the center of the table and is adapted to remove the finished articles from the mold and transfer them to a machine for a succeeding operation or to a conveyor. A suitable synchronizing device 16 is driven by the main drive for actuating the air operated devices at predetermined intervals. A suitable clutch is provided for rendering the drive and the synchronizing device effective, and is operated by a clutch lever 17 adapted to be moved into and out of effective position by a suitable handle rod 19. Preferably, the parts of the molding machine are mounted upon a suitable base 25 which may be provided with rollers to permit the machine to be readily moved about and placed into operative position with respect to a glass feeder for delivering charges of glass to the molds thereof.

Suitable devices are provided for improving the operation of the machine. These devices may comprise, a device for preventing the clutch lever from being moved into operative position unless the air pressure is effective, a device for preventing the plunger from being operated unless the anvil supports the bottom of the mold, a device for preventing rotation of the table while the plunger 9 extends into a mold, and a device for stopping rotation of the machine when a mold is moved into contact with the take-out mechanism. These devices, together with various elements of the glass molding machine described above, will be described in detail hereafter in the order stated above.

Figure 2:
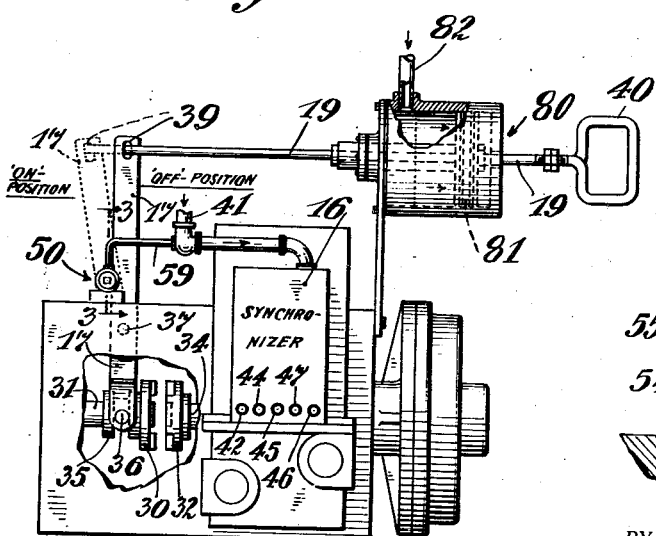
Fig. 2 is a side elevational view, partly in section, illustrating improvements associated with the clutch for the machine.
Figure 3:
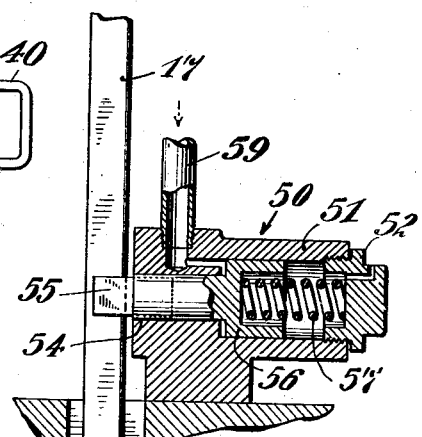
Fig. 3 is a sectional view taken along the line 3—3 of Fig. 2.

In Figs. 2 and 3 there is shown diagrammatically, a clutch mechanism and associated devices therefor. The clutch may comprise a suitable clutch face 30 slidably mounted on a shaft 31 rotated by a mechanical drive, such as an electric motor connected thereto through a Geneva drive or the like, and a second clutch face 32 mounted on a shaft 34 adapted to be driven to rotate the mold table 1. A collar or bushing 35 is mounted on the shaft 31 for moving the clutch face 30 into engagement with the clutch face 32 and the lower end of the clutch lever 17 is linked to the collar at 36, and pivoted at 37 to operate the clutch by moving the clutch lever towards the left as shown in dotted lines (Fig. 2). The handle rod 19 is linked to the upper end of the clutch lever at 39 and the free end of the rod is provided with a handle portion 40 to facilitate gripping the rod. The invention herein is not intended to be limited in any way to the particular clutch shown and any desired form of clutch may be substituted therefor.

A suitable synchronizing device is diagrammatically illustrated and may comprise a series of rotary valves (not shown) mounted on the driven shaft 34. These valves receive air pressure from a main air line 41 and are operated at predetermined intervals to actuate the pressure operated devices of the machine by air pressure leaving the outlets 42, 44, 45 and 46. The devices operated by these air lines will be described in detail hereafter. Such synchronizing devices are well known in the art and a detailed description thereof is not necessary.

It is very important that the clutch is not moved into operative position to rotate the table, unless air at a desired pressure is in the main air line 41. If the table is rotated without the air pressure being effective, the various devices operated by air pressure, for example, the plunger or the take-out mechanism, might not be in their proper position and a mold might collide therewith. In order to overcome these difficulties and to guard against starting the machine and accidentally rotating the table without air pressure being effective on the various air cylinders, a valve member 50 is provided adjacent the clutch lever 17. The valve comprises a substantially cylindrical casing 51 having a threaded cap 52 at one end thereof and an aperture 54 at the opposite end thereof for receiving an extension 55 formed on a piston 56 slidably retained within the casing. The piston 56 is moved away from the cap by a spring member 57 causing the extension 55 to project into the path of the clutch lever 17. An air pressure conduit 59 may be connected to the main air line 41 and to one end of the valve casing for admitting air pressure to one side of the piston 56 to move it inwardly in opposition to the spring 57, and to move the extension on the piston out of the path of the clutch lever 17. In this manner, if air, at a desired pressure, is in the main air line 41, the piston is moved inwardly to permit the clutch lever to be moved past the extension 55 to operate the clutch and rotate the table. If desired, the tension of the spring 57 may be controlled by screwing the cap 52, either inwardly or outwardly with respect to the valve casing, so that the spring controls the amount of pressure required to move the piston.

In Figs. 4 and 5 the plunger and plunger operating mechanism is illustrated, in detail. The plunger preferably comprises a suitable forming portion 60 operatively connected to a vertically reciprocating rod 61 by a suitable spring carriage 62. The rod 61 is adapted to be raised and lowered by the air cylinder 10 mounted above the mold table and air pressure is adapted to be admitted to the cylinder at desired intervals through the conduit 46 connected to the synchronizer or timing mechanism.

In order to minimize the strain on the mold table, occasioned by the downward thrust of the plunger, the bottom part 63 of the mold is adapted to be moved upwardly by a frame or yoke 64 having a spring 58 associated therewith, a roller 65 mounted thereon adapted to ride on a cam surface 66 for raising the frame and a suitable extension 67 provided at the lower end of the mold support adapted to be supported by the gate anvil 11. Preferably, the gate anvil is provided with a substantially circular bearing portion 69 and is pivotally mounted on a shaft 70 extending upwardly from the anvil block 12 through the bearing portion 69. The free end of the gate anvil has a substantially circular column portion 71 adapted to receive the lower end of the mold support while the plunger presses a tumbler or blank in a mold. An advantage of pivotally mounting the gate anvil is that in the event the mold support 64 is not raised and comes in contact with the gate anvil, it swings the gate anvil to one side without damaging the mold supporting member or the elevating carriage. If desired, both the bottom part of the mold and the upper mold part 7 may be raised upwardly to relieve the table entirely of the strain caused by the forming plunger.

A device is provided herein which permits the plunger 9 to be operated only when the gate anvil is in position to support a mold. This device comprises a valve 72 connected to the conduit 46 adapted to admit compressed air from the conduit 46 to the cylinder 10 for operating the plunger and a valve 74 connected to the valve 72 by a conduit 75 adapted to open the valve 72 by air pressure coming through the conduit 42 connected to the synchronizer. The valve 74 preferably has a projection 76 extending outwardly therefrom adapted to be engaged by a circular portion 77 on the pivoted end of the gate anvil to hold the valve open and a spring may be provided in the valve for holding the projection 76 outwardly. In order to close the valve 74 while the anvil is out of proper position as shown in dotted lines in Fig. 5, a cam dwell or recess 79 is provided in the circular part 77 adapted to receive the projection 76. When the projection is extended into the cam dwell by the valve spring, the valve 74 is closed and compressed air from the conduit 42 is shut off and cannot actuate the plunger operating valve 72. In this manner, operation of the plunger is prevented unless the gate anvil is in its proper position to support the mold.

Referring more particularly to Figs. 2 and 6 there is shown a device adapted to prevent rotation of the table while the forming plunger extends into a mold and until after the plunger has been raised clear of the molds on the table. This device preferably comprises an air cylinder 80 extending about the clutch operating rod 19 having a piston 81 therein, (Fig. 2) secured to the rod 19. Air pressure may be admitted to the cylinder 80 by a conduit 82 when rotation of the table is to be prevented to move the piston, the piston rod 19 and the clutch lever 17 towards the right (Fig. 2) which causes the clutch to disengage. When the clutch is out of operative position, the drive means will not be effective to rotate the table or operate the synchronizer, thus preventing further operation of the machine until the plunger is moved into its proper position. In order to operate the above safety device, the cylinder 80 preferably is actuated by a mechanism associated with the plunger (Fig. 6) which may comprise a valve 84 connected to the conduit 82 and to the air pressure line 44 connected to the synchronizer. The valve 84 is provided with an extension 85 adapted to be engaged and pushed inwardly in opposition to a spring in the valve for opening the valve. Preferably, the valve extension is operated by a suitable lever 86 pivoted on a bracket 87 at 89 and having a tapered or cam-shaped free end 90 which may be oscillated by a roller 91 carried on an arm 92 secured to the plunger rod 61. The roller 91 is adapted to engage the cam-shaped end 90 of the lever 86 when the plunger is moved downwardly to push the lever 86 inwardly against the valve extension 85 to open the valve 84. While the plunger is in substantially its lower position or in the path of the molds, the valve 84 is held open and at or about the time the plunger should have been raised, the synchronizer causes air pressure to flow through the pipe or conduit 44, which passes through the valve 84, the conduit 82 and into the cylinder 80 to throw out the clutch. If the plunger has been properly raised, the roller 91 does not engage the lever 86, as illustrated in dotted lines in Fig. 6, permitting the valve 84 to be closed by the spring therein.

In Fig. 7 several of the molds 7 on the mold table are shown as they pass the take-out mechanism 14. Preferably, the molds are provided with split rings 100 for forming the upper end of the ware which may be pivoted at 101 and may be opened and closed by suitable rods 102, connected to a suitable mechanism such as an air cylinder or the like. In the event that the ring molds are not properly opened or remain closed when they approach the take-out mechanism, they may collide therewith and cause damage to both the take-out mechanism and the molds. To eliminate this difficulty, the take-out arm is operated by an air cylinder 104 which is pivotally mounted on the column 15 so that when a mold comes in contact with the take-out arm the cylinder swings out of the way and at the same time actuates a mechanism adapted to stop rotation of the table immediately to prevent damage to the machine. To accomplish this, a valve 105 (Fig. 8) is provided adapted to admit air to the cylinder 80 for operating the clutch to stop the machine. The valve 105 may comprise a casing, a piston 106 mounted on a piston rod 107, and a spring member 109 for holding the piston in closed position. One end of the valve is connected to the compressed air line 45 coming from the synchronizer and a conduit 110 is connected to the other end of the valve which leads to the cylinder 80 for operating the rod 19 to throw out the clutch. The piston rod 107 preferably is connected to the take-out operating cylinder 104 at 111 so that when a mold comes in contact with the cylinder, the valve is operated in opposition to the spring 109. Compressed air is then adapted to pass through the valve 105 to operate the piston of the cylinder 80 and cause the clutch to disengage and stop the table rotating means. The spring 109 of the valve 105 is adapted to permit the cylinder 104 to swing a limited distance which is sufficient to open the valve and stop rotation of the table, and to return the cylinder to its proper position.

In Fig. 9 a diagram is shown illustrating how the various air conduits are operatively connected to the synchronizer and to the mechanism described herein. Air is adapted to enter the synchronizer from the main air line 41 to admit air to the valve 50 and permit operation of the clutch. The conduit 42 is provided with compressed air by the synchronizer prior to the moment the forming plunger is actuated and the anvil safety device 74 is adapted to be held open if the anvil is in proper position. The pressure in the conduit 42 then passes therethrough and actuates the plunger control valve 72 so that the plunger may be operated. The conduit 44 is provided with air pressure from the synchronizer and is connected to the plunger safety valve 84 adapted to be opened when the plunger is in a mold, whereby the air pressure passes through the valve and operates the air cylinder 80 for throwing out the clutch. The air line 45 is also provided with air pressure by the synchronizer and is connected to the take-out safety valve 105 adapted to be opened when a mold comes in contact with the take-out arm, whereby the air pressure passes through the valve and is effective to operate the clutch disengaging cylinder 80. The air pressure line 47 is adapted to supply compressed air to the take-out mechanism at desired intervals to remove ware from the molds. The synchronizer is also adapted to supply air pressure at desired intervals to other mechanisms which may be associated with the glass machine.

In the operation of the machine, compressed air is provided in the main air line 41 to move the clutch latch 50 and permit operation of the clutch. The drive means are then started and the table is rotated intermittently while the synchronizer actuates the various air operated mechanisms associated with the table. Gobs of glass are fed to the molds and the plunger is operated to press them into their desired shape. After the articles have been formed, the split ring molds 100 are swung open so that the ware may be ejected from the molds or may be engaged by the take-out device to transfer it to a conveyor or other mold table for performing a succeeding operation. Preferably, the table is rotated at a speed sufficiently great to produce from twenty to forty articles or blanks per minute. This is feasible because the improvements herein insure proper operation of the various mechanisms and prevent accidental damage of the machine.

It will be seen that the present invention provides an improved glass fabricating machine or the like, adapted to be operated at high speeds without danger of damaging any of the parts of the machine. The improvements insure coordination of the mechanisms for rotating the table, forming the ware and removing it from the molds. These devices may be inexpensively provided on both new and existing machines. A further advantage of the present invention is that all the operating mechanisms can be actuated or controlled from a single synchronizing unit. Also, the mechanism can be connected together so that a single device for stopping the machine may be actuated by one or more safety devices. The parts of the machine are rugged in construction and can readily withstand any rough use to which they may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a glass fabricating machine, the combination of a rotating table having a plurality of molds thereon, means for raising the lower portion of the molds upwardly, and an anvil pivotally mounted at one end and positioned to support the lower portions of the molds on its other end when said lower portions are in their raised position, said anvil being adapted to be swung out of the path of the lower portions of the molds by said lower portions of said molds when said raising means fail to raise the lower portions of the molds.

2. In a machine of the class described, the combination of a rotatable mold table, a plurality of forming molds on said table, means for opening said molds to permit the ware formed in said molds to be removed, means for removing the ware from the molds, said removing means being pivotally mounted to be swung or rotated with the table a slight distance when a mold comes in contact therewith, means for rotating said mold table, a clutch associated with said rotating means having an operating lever and a rod connected to said lever, a piston on said rod, a cylinder extending about said piston, a valve for admitting air to said cylinder, and means connecting said ware removing means to said valve whereby said valve is operated to admit air to said cylinder when said removing means is contacted by a mold which has failed to open.

3. In a machine of the class described, the combination of a rotatable mold table, means for rotating said table, a plurality of molds on said table, means for opening said molds, a central support extending above said table, a take-out mechanism mounted pivotally on said support and having a reciprocating arm provided with ware engaging jaws, a valve, means operated by compressed air rendered effective by said valve to stop said rotating means, and a rod connected to said take-out mechanism for operating said valve to stop said rotating means when a mold comes in contact with said take-out mechanism.

4. In a machine of the class described, the combination of a rotatable mold table, means for rotating said table, a plurality of molds on said table, means for opening said molds, a pivotally mounted take-out mechanism extending radially above said table and positioned with respect to said table to be swung in a horizontal plane and move slightly with said table in the direction the table is rotated when a mold accidentally comes in contact therewith, a valve having a spring therein, means operated by compressed air rendered effective by said valve to stop said rotating means, and a rod connected to said take-out mechanism for operating said valve when a mold which has not been moved out of the way of said take-out mechanism comes in contact therewith, said spring being effective to return said take-out mechanism to its proper position.

5. In a glass forming machine partly operated by compressed air, the combination of a mechanism for supplying and timing the periods at which compressed air is admitted to the operating parts of the machine, a drive for operating said timing mechanism, a clutch for connecting said timing mechanism to said drive, a manually operable clutch lever associated with said clutch, an air-cylinder having a piston provided with a projection extending into the path of said lever for preventing the clutch lever from being thrown into operating position unless air pressure is admitted to said cylinder, a plurality of safety devices operatively connected to said timing mechanism, and a second air cylinder operated by compressed air supplied by said timing mechanism in response to said safety devices to throw out said clutch.

6. In a machine of the class described, the combination of a mold table, a plurality of molds seated on said table, a plunger for forming articles in said molds, means for raising and lowering said plunger, a member for supporting said molds while said plunger is operative, said member being pivotally mounted at one end and adapted to be moved to one side if the molds come in contact therewith, a valve for controlling the operation of said plunger raising and lowering means, a second valve for controlling the operation of said first valve, and means positioned on said supporting member for actuating said second valve when said supporting member is in proper position.

7. In a machine of the class described, the combination of a mold table, a plurality of molds mounted on said table, a plunger for forming articles in said molds, means for operating said plunger, a conduit for periodically supplying compressed air to said means to operate said plunger, a pivotally mounted member for supporting said molds and positioned to be moved to one side if the lower portions of the molds come in contact therewith, said member having a cam portion, and a valve operated by said cam portion for opening and closing said conduit, said valve being closed to shut off the compressed air in said conduit when said member is not in proper position thereby to prevent operation of said plunger and being open to allow compressed air to flow through said conduit when said member is in proper position to permit operation of said plunger.

8. In a machine of the class described, the combination of a mold table, a mold on said mold table, an anvil block, a gate anvil pivotally mounted on said block for supporting said mold mounted on said mold table, a cam on said gate anvil, and a valve having a member associated therewith positioned to be engaged by said cam to close the valve when said anvil is out of proper position.

9. In a molding machine, partly operated by compressed air and partly operated by a suitable drive, a rotatable mold table having molds thereon, means for rotating said table, a forming plunger, means for raising and lowering said plunger to press a charge of glass in said molds, an anvil beneath said plunger for supporting said molds when said plunger is lowered to press a charge of glass, a take-out mechanism, means for preventing operation of said table rotating means when said plunger is in a mold, a second means for stopping said rotating means when a mold comes in contact with said take-out mechanism, and a valve for controlling the operation of the plunger raising and lowering means to prevent operation thereof when said anvil is not in its proper position.

JOHN W. ERRETT.